(12) United States Patent
Zhang (10) Patent No.: US 9,374,323 B2
(45) Date of Patent: Jun. 21, 2016

(54) COMMUNICATION BETWEEN ENDPOINTS IN DIFFERENT VXLAN NETWORKS

(71) Applicant: Futurewei Technologies, Inc., Plano, TX (US)

(72) Inventor: Hong Zhang, Palo Alto, CA (US)

(73) Assignee: Futurewei Technologies, Inc., Plano, TX (US)

( * ) Notice: Subject to any disclaimer, the term of this patent is extended or adjusted under 35 U.S.C. 154(b) by 262 days.

(21) Appl. No.: 13/936,493

(22) Filed: Jul. 8, 2013

(65) Prior Publication Data

US 2015/0009992 A1 Jan. 8, 2015

(51) Int. Cl.
*H04L 12/931* (2013.01)
(52) U.S. Cl.
CPC ..................................... *H04L 49/354* (2013.01)
(58) Field of Classification Search
CPC ........................... H04L 12/4633; H04L 49/354
USPC ........... 370/351, 389, 392, 395.1, 396, 395.3, 370/395.31, 395.5, 395.53, 400, 409, 431, 370/432, 464, 465, 470, 471
See application file for complete search history.

(56) References Cited

U.S. PATENT DOCUMENTS

2013/0250951 A1* 9/2013 Koganti ................ H04L 49/356
370/390
2013/0287036 A1* 10/2013 Banavalikar ............ H04L 45/00
370/401
2013/0311663 A1* 11/2013 Kamath et al. ................. 709/227
2013/0318219 A1* 11/2013 Kancherla ............... H04L 49/70
709/222
2014/0092907 A1* 4/2014 Sridhar et al. ................. 370/392
2014/0195695 A1* 7/2014 Okita ............................ 709/239
2014/0348166 A1* 11/2014 Yang et al. .................... 370/392
2014/0369345 A1* 12/2014 Yang et al. .................... 370/355
2014/0372582 A1* 12/2014 Ghanwani et al. ............ 709/223
2014/0376550 A1* 12/2014 Khan ...................... H04L 45/74
370/392

OTHER PUBLICATIONS

Mahalingam, et al., "VXLAN: A Framework for Overlaying Virtualized Layer 2 Networks over Layer 3 Networks," darft-mahalingam-dutt-dcops-vxlan-03.txt, Feb. 22, 2013, 22 pages.
Mahalingam, et al., "VXLAN: A Framework for Overlaying Virtualized Layer 2 Networks over Layer 3 Networks," darft-mahalingam-dutt-dcops-vxlan-03.txt, May 8, 2013, 22 pages.

* cited by examiner

*Primary Examiner* — Obaidul Huq
(74) *Attorney, Agent, or Firm* — Conley Rose, P.C.; Grant Rodolph; William H. Dietrich (57) ABSTRACT

A method for bridging communication between a plurality of Virtual eXtensible Local Area Network (VXLAN) networks, wherein the method comprises joining the VXLAN networks, obtaining a forwarding entry table that associates a plurality of endpoints with a plurality of VXLAN tunnel endpoints (VTEPs) within the VXLAN networks, receiving a VXLAN encapsulated data packet from one of the VXLAN networks, and transmitting the VXLAN encapsulated data packet using the forwarding entry table to a different VXLAN network.

20 Claims, 4 Drawing Sheets

COMMUNICATION BETWEEN ENDPOINTS IN DIFFERENT VXLAN NETWORKS

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Virtualization technologies may allow devices to fully utilize resources and processing capability by simultaneously performing applications and/or services within different virtual environments. For instance, virtualization of physical servers within a data center network may create numerous virtual machines (VMs) within each physical server. Each of the VMs may act as separate physical network devices that are capable of operating its own operating system (OS) and performing applications and services independent of other VMs. As such, the creation of VMs may increase server utilization by consuming available server resources and processing power that otherwise may not be consumed without virtual and overlay network technologies.

Unfortunately, server virtualization may inadvertently increase the demand on the network infrastructure used to facilitate data transfers between many of the VMs. One example of the demand increase on network infrastructure is managing the plethora of media access control (MAC) addresses assigned to VMs. Each of the VMs may be assigned to a MAC address, and as the number of VMs increase through server virtualization, the size of MAC address tables maintained by network nodes (e.g. a Top of Rack (ToR) switches) within the network may also increase. In some instances, a network node may not have enough memory to store the MAC address tables for all of the VMs associated with the network node. Another example of the demand increase on network infrastructure is the growing number of virtual networks. Currently, networks may group VMs according to their virtual local area network (VLAN) to route traffic amongst the VMs. However, VLAN technology may support a maximum of 4094 virtual networks, which is inadequate as networks become more complex and the number of VMs continue to increase.

Virtual eXtensible Local Area Network (VXLAN), as described in the Internet Engineering Task Force (IETF) document draft-mahalingam-dutt-dcops-vxlan-04.txt, entitled "VXLAN: A framework for Overlaying Virtualized Layer 2 Networks over Layer 3 Networks," published May 8, 2013, which is incorporated herein as if reproduced by its entirety, is an overlay technology that attempts to alleviate the problems described above. The VXLAN technology may divide a physical network into multiple virtual networks by implementing an Open Systems Interconnection (OSI) layer 2 overlay scheme over an OSI layer 3 network. VMs within the same VXLAN network may communicate with each other using a VXLAN tunneling mechanism. The current IETF VXLAN draft describes a communication mechanism between endpoints (e.g. VMs) within the same VXLAN and utilizing a VXLAN gateway to forward traffic between a VXLAN network and non-VXLAN network. However, the current IETF VXLAN draft does not describe a communication mechanism for communicating between an endpoint in one VXLAN network with an endpoint in another VXLAN network. Thus, a communication mechanism is needed to enable communication between endpoints that participate in different VXLAN networks.

SUMMARY

In one example embodiment, a network node for bridging communication between a plurality of VXLAN networks such that the network node is configured to join one or more VXLAN networks, and obtain a forwarding entry table that associates a plurality of endpoints with a plurality of VXLAN tunnel endpoints (VTEPs) within the VXLAN networks. The network node may receive a VXLAN encapsulated data packet from one of the VXLAN networks and subsequently transmit the VXLAN encapsulated data packet using the forwarding entry table to a different VXLAN network.

In another example embodiment, a network node for bridging communication between a first VXLAN network and a second VXLAN network that may be configured to receive a VXLAN encapsulated data packet from the first VXLAN network. The VXLAN encapsulated data packet may comprise a VXLAN header that references the address of the network node. After receiving the VXLAN encapsulated data packet, the network node may remove the VXLAN header and encapsulate a second VXLAN header that references the address of a destination VTEP to form a second VXLAN encapsulated data packet. The network node may then transmit the second VXLAN encapsulated data packet to the second VXLAN network. The first VXLAN network and the second VXLAN network may be different VXLAN networks.

In yet another example embodiment, a VXLAN gateway may be configured to join a plurality of VXLAN networks and obtain a forwarding entry table that associates a plurality of endpoint addresses to a plurality of VTEP addresses. The VXLAN gateway may also maintain a plurality of MAC addresses for the endpoints. When the VXLAN gateway receives a VXLAN encapsulated packet from a source VTEP, the VXLAN gateway may forward the VXLAN encapsulated packet to a destination VTEP. The source VTEP and the destination VTEP may be located within different VXLAN networks.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents. While certain aspects of conventional technologies have been discussed to facilitate the present disclosure, applicants in no way disclaim these technical aspects, and it is contemplated that the present disclosure may encompass one or more of the conventional technical aspects discussed herein.

Disclosed herein are various example embodiments to facilitate communication between endpoints located in different VXLAN networks. A VXLAN gateway may join the tunnel learning for multiple VXLAN networks (e.g. more than one VXLAN network). After joining the different VXLAN networks, the VXLAN gateway may build a forwarding entry table and/or obtain a forwarding entry table used to forward data packets between endpoints located in different VXLAN networks. The Internet Protocol (IP) address for the VXLAN gateway may be treated as the default destination address when a source VTEP is unable to locate the address of a destination VTEP associated with the destination endpoint. When the source VTEP receives a data packet from the source endpoint and is unable to locate the address of the destination VTEP, the source VTEP may encapsulate a VXLAN header and forward the data packet to the VXLAN gateway. Afterwards, the VXLAN gateway may retrieve the address of the destination VTEP using the forwarding entry table, and encapsulate a new VXLAN header using the address of the destination VTEP. The VXLAN gateway may then forward the encapsulated data packet to the destination VTEP, which will forward the data packet to the destination endpoint.

Figure 1:
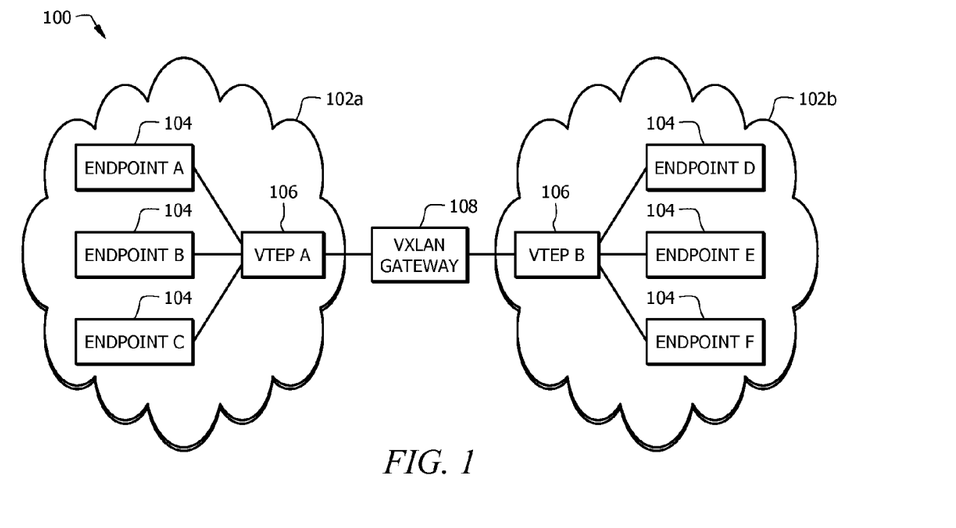
FIG. 1 is a schematic diagram of an example embodiment of a network system where embodiments of the present disclosure may operate.

FIG. 1 is a schematic diagram of an example embodiment of a network system 100 where embodiments of the present disclosure may operate. Network system 100 may be any network system that comprises at least two different VXLAN networks 102a and 102b. The VXLAN networks 102a and 102b may be VXLAN networks as described in the IETF draft-mahalingam-dutt-dcops-vxlan-04.txt. Each VLAN network 102a and 102b may be associated with a multicast group or a broadcast group. VXLAN networks 102a and 102b may each comprise a plurality of endpoints 104 and a VTEP 106. The VXLAN networks 102a and 102b may be bridged by a VXLAN Gateway 108 that transports data traffic between VXLAN networks 102a and 102b. Persons of ordinary skill in the art are aware that each of the VXLAN networks 102a and 102b may further comprise more than one VTEP 106, which may be directly connected to each other or interconnected using OSI layer 2 and layer 3 network nodes (e.g. OSI layer 2 and 3 switches).

FIG. 1 illustrates that endpoints 104 may be coupled to VTEP 106. Endpoints 104 may include, but are not limited to VMs, hosts, servers, storage devices or other types of end devices that may originate data into or receive data from network system 100. Endpoints 104 may be unaware of VXLAN networks 102a and 102b, and may transmit data packets directly to a VTEP 106. In other words, the VXLAN outer header may not be used by the endpoints 104 when transmitting data packets to VTEP 106. VTEP 106 may be any type of network node configured to produce stateless tunnels by encapsulating the data packets received from the endpoints 104 using a VXLAN outer header as described in the IETF draft-mahalingam-dutt-dcops-vxlan-04.txt. Each of the VTEPs 106 may be associated with one or more endpoints 104. VTEP 106 may also be configured to lookup the VXLAN Network Identifier (VNI) associated with each of the endpoints 104. VTEP 106 may include, but are not limited to network switches, servers, and/or access nodes (e.g. ToR switches), and may be implemented using software, hardware, or a combination of both. In one example embodiment, when endpoints 104 are VMs, the VTEP 106 may be located within the hypervisor of the server that houses endpoints 104.

FIG. 1 also depicts a VXLAN gateway 108 that bridges communication between VTEP A 106 and VTEP B 106. The VXLAN gateway 108 may be directly connected to VTEP A 106 and/or VTEP B 106 such that no intermediate nodes are connected between VTEPs 106 and VXLAN gateway 108. Alternatively, the VXLAN gateway 108 may be coupled to VTEP A 106 and/or VTEP B 106 such that the interconnections between VTEPs 106 and VXLAN gateway 108 include OSI layer 2 and layer 3 network nodes. The VXLAN gateway 108 may be any network node, such as an access node, directory node, network switch, server, a VM, and/or virtual service gateway implemented at OSI layers 4 and higher that is configured to bridge communication for at least two VXLAN networks 102a and 102b. The VXLAN gateway 108 may be located within the core or at the edge of network system 100 and may join both VXLAN network 102a and 102b (e.g. joining two different multicast groups). By joining both VXLAN network 102a and 102b, VXLAN gateway 108 may have dual roles by acting as a VTEP in both VXLAN network 102a and 102b. Although FIG. 1 illustrates that VXLAN gateway 108 joins and bridges two VXLAN networks 102a and 102b, other example embodiments of network system 100 may have VXLAN gateway 108 join and bridge communications for more than two VXLAN networks 102.

The VXLAN gateway 108 may be configured to build a forwarding entry table that associates endpoint addresses to VTEP addresses within each of the VXLAN networks 102a and 102b. For example, VXLAN gateway 108 may build a forwarding entry table that associates the addresses of endpoints A-C 104 to the address of VTEP A 106 and associates the address of endpoints D-F 104 to the address of VTEP B 106. In one example embodiment, the forwarding entry tables may associate the IP addresses of the endpoints 104 to the IP addresses of the VTEPs 106. Other example embodiments of the forwarding entry tables may also associate the MAC addresses of the endpoints 104 to the MAC addresses of the VTEPs 106.

The forwarding entry table may be built up using source learning and/or may be obtained from the control plane and/or a network node, such as a directory node within network system 100 that stores the mapping information. Source learning occurs when an endpoint, VXLAN gateway, or other network node transmits an Address Resolution Protocol (ARP) request. The ARP request may be received by a VTEP, and the VTEP may append a multicast header to the join request and forwards the ARP request to all network nodes (e.g. multicast) within the VXLAN network (e.g. a multicast group). Each of the network nodes that receive the request may subsequently update its own forwarding entry table to associates the VTEP that forwarded the ARP request to the network node that originated the ARP request.

The address of VXLAN gateway 108 may be configured as the default VTEP destination address within VXLAN networks 102a and 102b. When any of the VTEPs 106 are unable to locate the address of a VTEP 106 associated with an destination endpoint 104, the VTEP 106, as a default, may transmit the data packet to the VXLAN gateway 108 for proper routing. For example, endpoint A 104 within VXLAN network 102a may want to transmit a data packet to endpoint D 104 located in VXLAN network 102b. Endpoint A 104 within VXLAN network 102a may initially transmit the data packet to VTEP A 106. After receiving the data packet, VTEP A 106 may be unable to locate the address of VTEP B 106 because endpoint D 104 is located outside VXLAN network 102a. As a result, VTEP A may then forward the data packet to VXLAN gateway 108 for proper routing. Transmitting and receiving a data packet between different VXLAN networks will be discussed in more detail in FIGS. 3 and 4.

Figure 2:
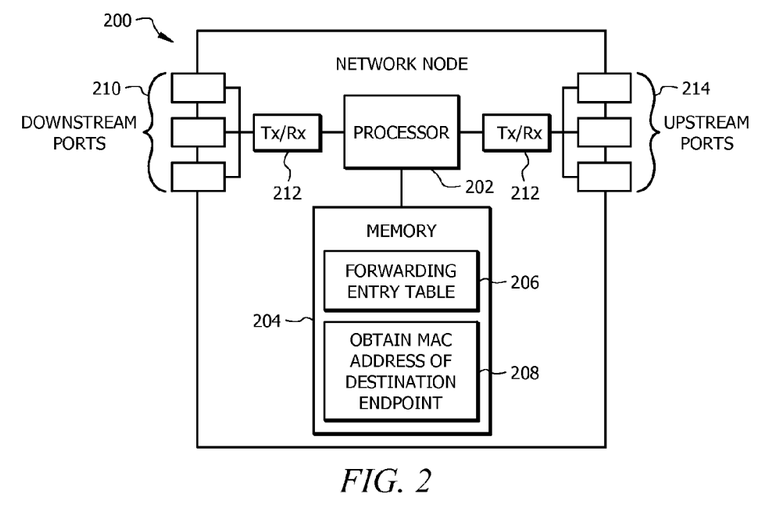
FIG. 2 is a schematic diagram of an example embodiment of a network node used to provide communication between endpoints in different VXLAN networks.

FIG. 2 is a schematic diagram of an example embodiment of a network node 200, such as a VTEP 106 and VXLAN gateway 108 in FIG. 1, used to provide communication between endpoints in different VXLAN networks. Network node 200 may be a node used to facilitate communication between two endpoints in different VXLAN networks. Network node 200 may comprise one or more transmitter (Tx)/receiver (Rx) units 212 coupled to downstream ports 210 and upstream ports 214 used to transmit data to or receive data from other network nodes 200. The downstream ports 210 and/or upstream ports 214 may include electrical and/or optical transmitting and/or receiving components and may act as an interface to receive and/or transmit data. A processor 202 may be coupled to each of the Tx/Rx units 212 to process data (e.g. VXLAN encapsulated packets) and/or determine where to route data. The processor 202 may comprise one or more processors, multi-core processors, and/or memory module 204 (e.g. cache), which may function as data stores, buffers, etc. The processor 202 may be implemented as one or more central processing unit (CPU) chips, cores (e.g., a multi-core processor), field-programmable gate arrays (FPGAs), application specific integrated circuits (ASICs), and/or digital signal processors (DSPs). Although illustrated as a single processor, the processor 202 is not so limited and may comprise multiple processors. The processor 202 may be configured to implement any of the schemes described herein, including method 600.

A memory module 204 may be coupled to the processor 202 and may be non-transitory medium configured to store various types of data. Memory 204 may comprise memory devices including secondary storage, read only memory (ROM), and random access memory (RAM). The secondary storage is typically comprised of one or more disk drives or tape drives and is used for non-volatile storage of data and as an over-flow data storage device if the RAM is not large enough to hold all working data. The secondary storage may be used to store programs that are loaded into the RAM when such programs are selected for execution. The ROM is used to store instructions and perhaps data that are read during program execution. The ROM is a non-volatile memory device that typically has a small memory capacity relative to the larger memory capacity of the secondary storage. The RAM is used to store volatile data and perhaps to store instructions. Access to both the ROM and the RAM is typically faster than to the secondary storage.

The memory module 204 may be used to house the instructions for carrying out the system and methods described herein, e.g., building the forwarding entry table and obtaining the MAC address of the destination endpoint. The memory module 204 may comprise a forwarding entry table 206 that may be built and modified using processor 202. Alternately, the forwarding entry table 206 may be implemented directly on the processor 202. The forwarding entry table 206 may associate VTEP addresses to endpoint addresses. In one example embodiment, the forwarding entry table may associate the IP addresses of VTEPs to the IP addresses of endpoints. In another example embodiment, the forwarding entry table 206 may associate both the IP addresses and the MAC addresses of VTEPs to the IP addresses and MAC address of endpoints. The memory module 204 may further comprise an "Obtain MAC address of Destination Endpoint" module 208 that may be built and modified using processor 202 and/or may be implemented directly on the processor 202. The "Obtain MAC address of Destination Endpoint" module 208 may initiate an ARP request to obtain the MAC address of the destination endpoint. Upon receiving the ARP reply, the "Obtain MAC address of Destination Endpoint" module 208 may also store the MAC information in an ARP cache and/or forwarding entry table 206.

It is understood that by programming and/or loading executable instructions onto the network node 200, at least one of the Tx/Rx units 212, the processor 202, or the memory module 204 are changed, transforming the network node 200 in part into a particular machine or apparatus having the novel functionality taught by the present disclosure, such as the transmitting node and/or receiving node. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Figure 3:
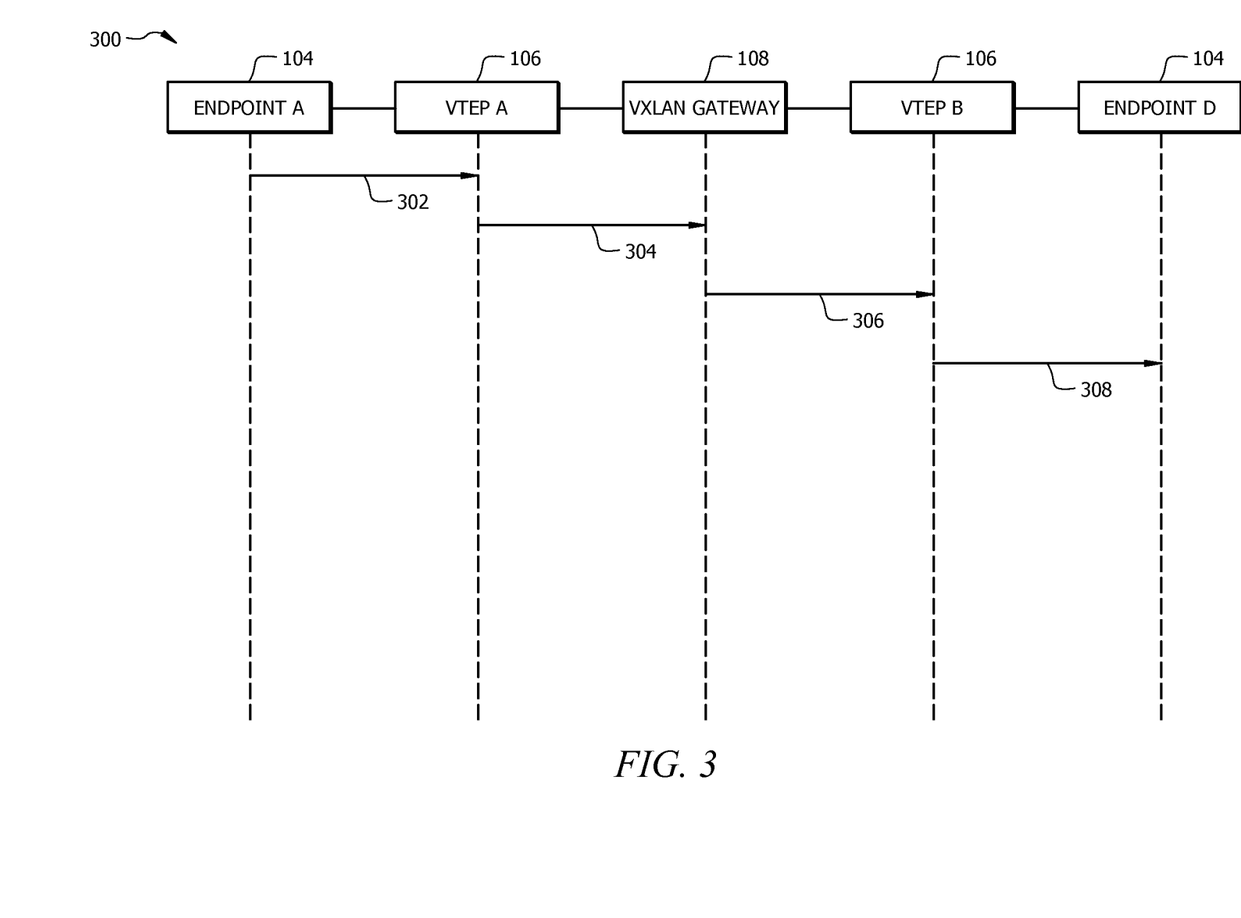
FIG. 3 is a protocol diagram of an example embodiment of a message exchange process for communicating with endpoints in different VXLAN networks.

FIG. 3 is a protocol diagram of an example embodiment of a message exchange process 300 for communicating with endpoints in different VXLAN networks. With reference to FIG. 1, FIG. 3 illustrates that endpoint A 104 and VTEP A 106 may participate in one VXLAN network (e.g. VXLAN network 102*a*) and endpoint D 104 and VTEP B 106 participate in another VXLAN network (e.g. VXLAN network 102*b*). Previously in inter-VLAN communication, operators and/or network administrators may manually configure different VLAN interfaces and associate the IP subnets for a network node (e.g. an OSI layer 3 switch). The network node may be manually configured with multiple VLAN interfaces and each VLAN interface may be pre-assigned with IP subnet addresses that are associated with each of the VLANs. The configurations newly implemented may then be added as new routing entries within the routing table. In contrast to inter-virtual local area network (VLAN) communication, the VXLAN gateway 108 may automatically build the forwarding entry table that associate VTEPs 106 to their corresponding endpoints 104 and may not need manual configuration of the VLAN interfaces.

FIG. 3 illustrates that endpoint A 104 may transmit a data packet 302 destined for endpoint D 104. Data packet 302 may be a MAC frame that may be transmitted to VTEP A 106. The data packet 302 may comprise a header that includes a destination MAC address that references the default gateway MAC. A default gateway MAC may be used as the destination address because endpoint D 104 is located in another VXLAN network. Once VTEP A 106 receives data packet 302, VTEP A 106 may perform a lookup to determine the VNI for endpoint A 104. Additionally, VTEP A 106 may be unable to locate the address of VTEP B 106 (e.g. the destination VTEP 106) because endpoint D 104 is located in another VXLAN network.

As discussed earlier, the address of VXLAN gateway 108 may be configured as the default address for the VXLAN networks that VXLAN gateway participates in. When a source VTEP 106 is unable to locate the address of the destination VTEP 106, the source VTEP 106 may forward the data packet to the VXLAN gateway 108. Hence, VTEP A 106 may use the address of the VXLAN gateway 108 as the address for the destination VTEP 106. VTEP A 106 may obtain the MAC address and IP address of the VXLAN gateway 108 and encapsulate a VXLAN header that references the MAC address and IP address of VXLAN gateway 108. The VXLAN header may be added in front of the data packet 302 such that the header of data packet 302 is positioned as the inner header and the VXLAN header is positioned as the outer header. Afterwards, VTEP A 106 may transmit the VXLAN encapsulated data packet 304 to VXLAN gateway 108.

When VXLAN gateway 108 receives the VXLAN encapsulated data packet 304, the VXLAN gateway 108 may remove the VXLAN header inserted by VTEP A 106 and replace the default gateway MAC address in data packet 302 with the MAC address of endpoint D 104. In some instances, the VXLAN gateway 108 may initiate an ARP request within the VXLAN network that endpoint D 104 is located in (e.g. VXLAN network 102*b*) to obtain the MAC address of endpoint D 104. The ARP request may be used to obtain the MAC address of endpoint D 104 when the VXLAN gateway 108 is unaware of the MAC address of endpoint D. In other words, the VXLAN gateway 108 may not initiate an ARP request when endpoint D's 104 MAC address is stored within the VXLAN gateway's 108 ARP cache and/or forwarding entry table. Upon receiving the ARP reply, the VXLAN gateway 108 may modify the contents of data packet 302 by replacing the default gateway MAC address with the MAC address of endpoint D 104. Additionally, the VXLAN gateway 108 may save the MAC address of endpoint D 104 within the ARP cache and/or forwarding entry table to prevent initiating another ARP request when the VXLAN gateway 108 receives another data packet destined for endpoint D 104.

The VXLAN gateway 108 may obtain the IP address of VTEP B 106 from a forwarding entry table located within the VXLAN gateway 108. The VXLAN gateway 108 may obtain the IP address for the destination endpoint from the VXLAN encapsulated data packet received from VTEP A 106. The VXLAN gateway may subsequently match the IP address of the destination endpoint to an entry in the forwarding entry table. The entry may comprise the IP address of the VTEP associated with the destination endpoint. In one example embodiment, the forwarding entry table may be built using source learning. In another example embodiment, the VXLAN gateway 108 may obtain the forwarding entry table from the control plane and/or another network node within the network, such as a directory node.

The VXLAN gateway 108 may subsequently encapsulate the modified data packet (e.g. data packet that includes MAC address of endpoint D 104) with a new VXLAN header that references the address of VTEP B 106 as the destination address. After encapsulation, the VXLAN gateway 108 may forward the VXLAN encapsulated data packet 306 to VTEP B 106. Once VTEP B 106 receives the VXLAN encapsulated data packet 306, VTEP B 106 may remove the VXLAN header and forward data packet 308 to endpoint D 104 using the destination MAC address of endpoint D 104. The packet structure for data packet 302 and 308, and VXLAN encapsulated data packet 304 and 306 will be discussed in more detail in FIGS. 4-7.

Figure 4:
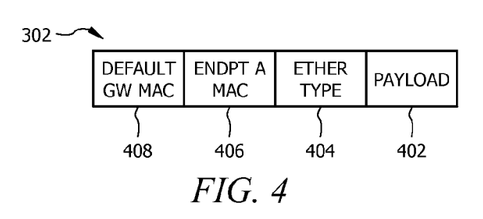
FIG. 4 is a schematic diagram of an example embodiment of data packet that is transmitted from a source endpoint to a source VTEP.
Figure 5:
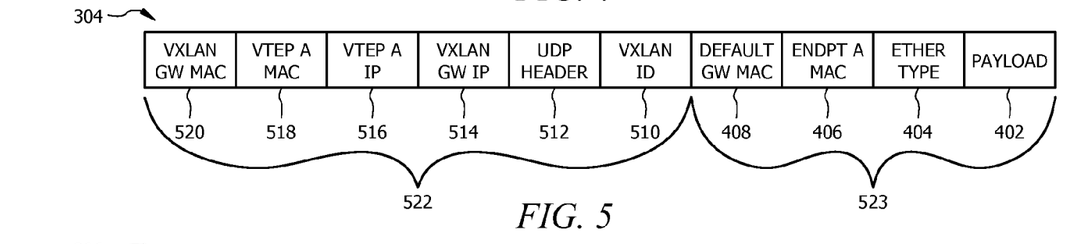
FIG. 5 is a schematic diagram of an example embodiment of a VXLAN encapsulated data packet that is transmitted from a source VTEP to a VXLAN gateway.
Figure 6:
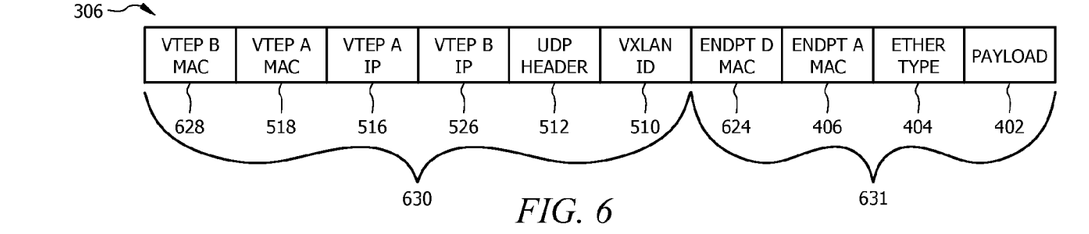
FIG. 6 is a schematic diagram of an example embodiment of a VXLAN encapsulated data packet that is transmitted from a VXLAN gateway to a destination VTEP.
Figure 7:
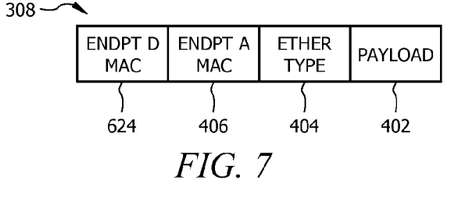
FIG. 7 is a schematic diagram of an example embodiment of a data packet that is transmitted from a destination VTEP to the destination endpoint.

FIGS. 4-7 depicts the different data packets that are encoded and transmitted during the message exchange process 300 shown in FIG. 3. Specifically, FIGS. 4 and 7 illustrate the frame structures for data packets 302 and 308 from FIG. 3, respectively, and FIGS. 5 and 6 illustrate the frame structures for VXLAN encapsulated data packets 304 and 306 from FIG. 3, respectively. FIG. 4 is a schematic diagram of an example embodiment of data packet 302 that is transmitted from a source endpoint to a source VTEP. In reference to FIG. 3, data packet 302 is the data packet transmitted from endpoint A 104 to VTEP A 106. Data packet 302 may comprise payload 402, ether type 404, endpoint A MAC address 406 and default gateway MAC address 408. Payload 402 may comprise the IP address for the source endpoint (e.g. endpoint A) and the destination endpoint (e.g. endpoint D), and the data for data packet 302. Ether type 404, endpoint A MAC address 406, and default gateway MAC address 408 may be located within the header of data packet 302. Ether type 404 may indicate the protocol used to encapsulate payload 402. Endpoint A MAC address 406 may indicate the MAC address of the source endpoint. In reference to FIG. 3, endpoint A is the source endpoint, and thus data packet 302 uses the MAC address of endpoint A as the MAC address of source endpoint. The default gateway MAC address 408 may indicate the MAC address of the destination endpoint. As discussed earlier, because the actual destination endpoint (e.g. endpoint D 104) is located in another VXLAN network, the default gateway MAC address 408 may be inserted as the MAC address for the destination endpoint.

FIG. 5 is a schematic diagram of an example embodiment of a VXLAN encapsulated data packet 304 that is transmitted from a source VTEP to a VXLAN gateway. As shown in FIG. 3, VXLAN encapsulated data packet 304 is transmitted from VTEP A 106 (e.g. source VTEP) to VXLAN gateway 108. VXLAN encapsulated data packet 304 may comprise a VXLAN header 522 and an encapsulated data packet 523. The encapsulated data packet 523 may be substantially similar to data packet 302 shown in FIG. 4. The header of the encapsulated data packet 523 may be the inner header, while the VXLAN header 522 may be the outer header.

The VXLAN header 522 may comprise a VXLAN identifier (ID) 510, a User Datagram Protocol (UDP) header 512, the VXLAN gateway IP address 514, the VTEP A IP address 516, the VTEP A MAC address 518, and the VXLAN gateway MAC address 520. The VXLAN ID 510 may identify the VXLAN network associated with the source endpoint (e.g. endpoint A 104). The UDP header 512 may identify the source port and destination port used to transmit and receive the VXLAN encapsulated data packet 304. The VXLAN gateway IP address 514 and VXLAN gateway MAC address 520 may indicate the IP address and MAC address of the destination VTEP, respectively. Recall that in FIG. 3, that VTEP A 106 may use the address of the VXLAN gateway 108 as the destination VTEP address when VTEP A 106 is unable to locate the address of the destination VTEP. As such, the VXLAN gateway IP address 514 and VXLAN gateway MAC address 520 may be inserted as the VTEP destination address. VTEP A IP address 516 and VTEP A MAC address 518 may indicate the IP address and MAC address of the source VTEP, respectively. As shown in FIG. 3, VTEP A 106 acts as the source VTEP by receiving the data packet 302 from endpoint A 104 (e.g. source endpoint) and forwarding the VXLAN encapsulated data packet 304 to VXLAN gateway 108.

FIG. 6 is a schematic diagram of an example embodiment of a VXLAN encapsulated data packet 306 that is transmitted from a VXLAN gateway to a destination VTEP. In FIG. 3, the VXLAN encapsulated data packet 306 is transmitted from VXLAN gateway 108 to VTEP B 106. Recall that the VXLAN gateway 108 may remove the VXLAN header from VXLAN encapsulated data packet 304 and encapsulate a new VXLAN header 630 to create VXLAN encapsulated data packet 306. The new VXLAN header 630 for VXLAN encapsulated data packet 306 is similar to VXLAN header 522 in FIG. 5 except that VXLAN header 630 replaces the address of the VXLAN gateway with the address of VTEP B. FIG. 6 illustrates that VTEP B MAC address 628 and VTEP B IP address 426 are inserted into the location reserved for the MAC and IP address of the destination VTEP, respectively.

FIG. 6 also depicts that the VXLAN gateway may modify the header of the encapsulated data packet 631 (e.g. inner header of the VXLAN encapsulated data packet 306). Specifically, the VXLAN gateway may replace the default gateway MAC address 408 shown in FIG. 5 with endpoint D MAC address 624. Endpoint D MAC address 624 may indicate the MAC address for the destination endpoint. As discussed in FIG. 3, the VXLAN gateway 108 may obtain the MAC address of the destination endpoint (e.g. endpoint D 104) from the ARP cache, forwarding entry table, or from an ARP request. After obtaining the MAC address for the destination endpoint, the VXLAN gateway 108 may replace the default gateway MAC address 408 shown in FIG. 5 with the endpoint D MAC address 624.

FIG. 7 is a schematic diagram of an example embodiment of a data packet 308 that is transmitted from a destination VTEP to the destination endpoint. As shown in FIG. 3, data packet 308 is transmitted from VTEP B 106 (e.g. destination VTEP) to endpoint D 104 (destination endpoint). When VTEP B 106 receives the VXLAN encapsulated data packet 306, VTEP B 106 may remove the VXLAN header 630 shown in FIG. 6 and transmit data packet 308 to endpoint D 104. VTEP B 106 may use the endpoint D MAC address 624 to determine the proper destination endpoint 104. Data packet 308 may be substantially similar to encapsulated data packet 631 shown in FIG. 6.

Figure 8:
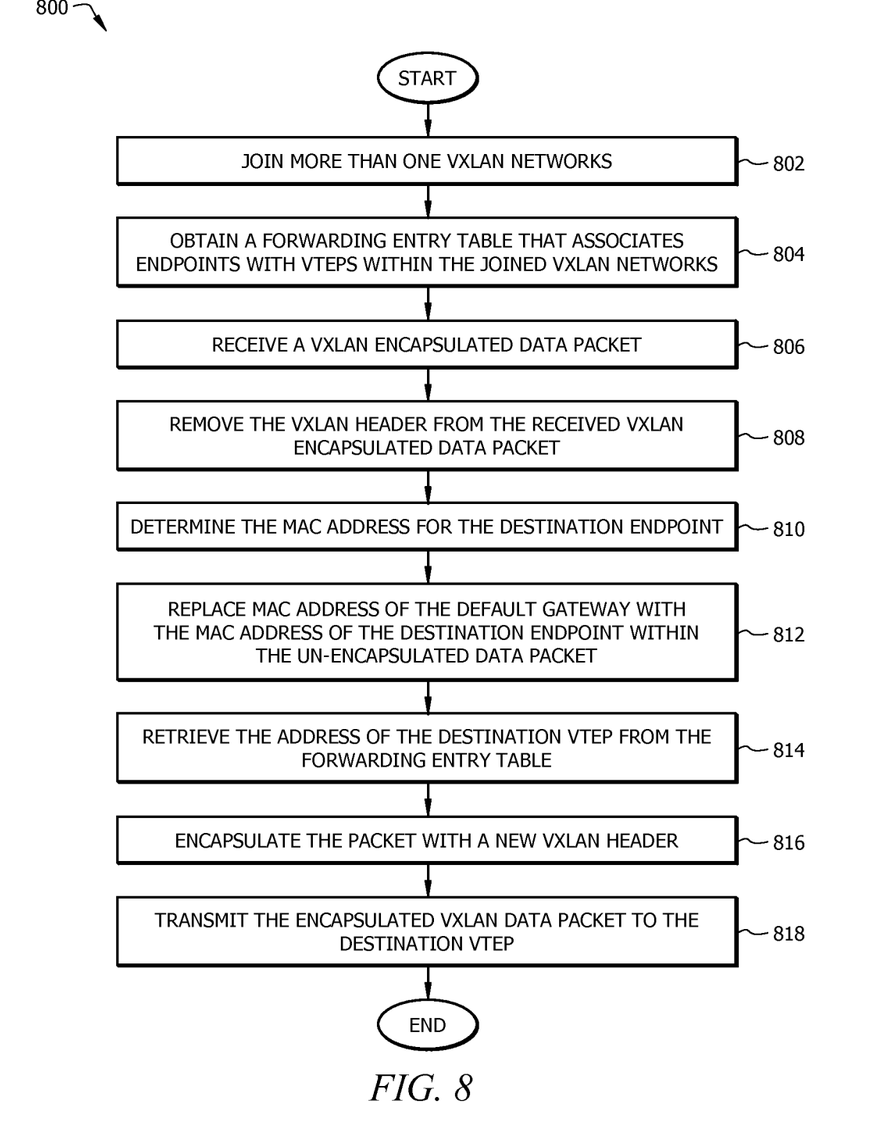
FIG. 8 is a flowchart of an example embodiment of a method that routes traffic for endpoints located in different VXLAN networks.

FIG. 8 is a flowchart of an example embodiment of a method 800 that routes traffic for endpoints located in different VXLAN networks. Method 800 may be implemented by a VXLAN gateway. Method 800 may start at block 802 and join more than one VXLAN networks. Method 800 may then proceed to block 804 and obtain a forwarding entry table that associates the endpoints with VTEPs within the joined VXLAN networks. The forwarding entry table may comprise endpoints and VTEPs that are located within different VXLAN networks. The forwarding entry table may be built using source learning and/or obtained from the control plane and/or a network node, such as the directory node.

After block 804, method 800 may proceed to block 806 and receive a VXLAN encapsulated data packet. At block 806, method 800 may receive the VXLAN encapsulated packet from a source VTEP. The VXLAN encapsulated data packet may have originated from a source endpoint and may be destined for a destination endpoint located in a different VXLAN network than the VXLAN network associated with the source endpoint. After receiving the VXLAN encapsulated data packet, method 800 may proceed to block 808 and remove the VXLAN header from the received VXLAN encapsulated data packet. Method 800 may then continue to block 810 and determine the MAC address for the destination endpoint. Method 800 may determine the MAC address for the destination endpoint by initiating an ARP request or obtaining the MAC address from an ARP cache and/or the forwarding entry table. Method 800 then moves to block 812 and replaces the MAC address of the default gateway with the MAC address of the destination endpoint within the un-encapsulated data packet.

Once the method 800 completes block 812, method 800 continues to block 814 and retrieves the address of the destination VTEP from the forwarding entry table. The destination VTEP may be the VTEP that may forward the data packet to the destination endpoint. Method 800 then moves to block 816 and encapsulates the packet with a new VXLAN header. The VXLAN header may comprise the MAC address and IP address of the destination VTEP. After encapsulation, method 800 may then continue to block 818 to transmit the encapsulated VXLAN data packet to the destination VTEP. After method 800 completes block 818, method 800 may then end.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 70 percent, 71 percent, 72 percent, . . . , 95 percent, 96 percent, 97 percent, 98 percent, 99 percent, or 100 percent. Moreover, any numerical range defined by two R numbers as defined in the above is also specifically disclosed. The use of the term about means ±10% of the subsequent number, unless otherwise stated. Use of the term "optionally"

with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

I claim:

1. A method for bridging communication between a plurality of Virtual eXtensible Local Area Network (VXLAN) networks, wherein the method comprises;
   joining the VXLAN networks using a VXLAN gateway;
   obtaining a forwarding entry table that associates a plurality of endpoints with a plurality of VXLAN tunnel endpoints (VTEPs) within the VXLAN networks;
   receiving a VXLAN encapsulated data packet from one of the VXIAN networks, wherein the VXLAN encapsulated data packet identifies a default gateway Media Access Control (MAC) address corresponding to the VXLAN gateway in an inner header and an address of the VXLAN gateway as a destination address in a VXLAN header;
   replacing the default gateway MAC address with an endpoint MAC address in the inner header and replacing the address of the VXLAN gateway with a destination virtual tunnel endpoint (VTEP) address in the VXLAN header, and
   transmitting the VXLAN encapsulated data packet using the forwarding entry table to a different VXLAN network.

2. The method of claim 1, wherein the forwarding entry table is built using source learning.

3. The method of claim 1 further comprising removing the VXLAN header from the received VXLAN encapsulated data packet and encapsulating a second VXLAN header to the VXLAN encapsulated data packet.

4. The method of claim 3, wherein the second VXLAN header references the address of the destination VTEP located in the different VXLAN network.

5. The method of claim 1 further comprising determining a MAC address for a destination endpoint located within the different VXLAN network, and wherein the VXLAN encapsulated data packet is destined for the destination endpoint.

6. The method of claim 5 further comprising inserting the MAC address for the destination endpoint into the VXLAN encapsulated data packet prior to transmitting the VXLAN encapsulated data packet.

7. The method of claim 5, wherein the MAC address for the destination endpoint is obtained by initiating an Address Resolution Protocol (ARP) request.

8. The method of claim 1, wherein the forwarding entry table associates the endpoints with the VTEPs by matching the addresses of the endpoints to the addresses of the VTEPs that correspond to the endpoints.

9. The method of claim 8, wherein the addresses of the endpoints and the addresses of the VTEPs are Internet Protocol (IP) addresses.

10. The method of claim 8 further comprising retrieving the address of a destination VTEP using the address of a destination endpoint and transmitting the VXLAN encapsulated data packet to the destination VTEP, wherein the destination VTEP is located within the different VXLAN network.

11. The method of claim 10, wherein the address of the destination endpoint is obtained from the VXLAN encapsulated data packet, and wherein the destination endpoint is located within the different VXLAN network.

12. An apparatus for bridging communication between a first Virtual eXtensible Local Area Network (VXLAN) network and a second VXLAN network, comprising:
   a receiver configured to receive a VXLAN encapsulated data packet from the first VXLAN network, wherein the VXLAN encapsulated data packet comprises an n header that references a default gateway Media Access Control (MAC) address corresponding to the apparatus and a VXLAN header that references an address of the apparatus as a destination address;
   a processor coupled to the receiver, wherein the processor is configured to:
      remove the VX LAN header; and
      encapsulate a second VXI AN header that references an endpoint MAC address in the inner header instead of the default gateway MAC address corresponding to the apparatus and references the address of a destination VXLAN tunnel endpoint (VTEP) instead of the address of the apparatus as the destination address to form a second VXLAN encapsulated data packet; and
   a transmitter coupled to the processor, wherein the transmitter is configured to transmit the second VXLAN encapsulated data packet to the second VXLAN network,
   wherein the first VXLAN network and the second VXLAN network are different VXLAN networks.

13. The apparatus of claim 12, wherein the VXLAN encapsulated data packet further comprises an Internet Protocol (IP) address of the destination endpoint, and wherein the processor is further configured to lookup the address of the destination VTEP using the IP address of the destination endpoint.

14. The apparatus of claim 13, wherein the second VXLAN encapsulated data packet is transmitted to the destination VTEP, and wherein the destination VTEP is located in the second VXLAN network.

15. The apparatus of claim 12, wherein the processor is further configured to obtain the endpoint MAC address from one of an Address Resolution Protocol (ARP) cache, an ARP request, and a forwarding entry table prior to encapsulating the second VXLAN header.

16. The apparatus of claim 12, wherein the VXLAN header comprises a media access control (MAC) address for the apparatus and an Internet Protocol (IP) address for the apparatus, and wherein the processor is further configured to replace the MAC address for the apparatus with a MAC address for the destination VTEP and replace the IP address for the apparatus with an IP address for the destination VTEP to tonal the second VXLAN header.

17. A computer program product comprising computer executable instructions stored on a non-transitory medium that when executed by a processor causes a Virtual eXtensible Local Area Network (VXLAN) gateway to perform the following:
  join a plurality of VXLAN networks;
  obtain a forwarding entry table that associates a plurality of endpoint addresses to a plurality of VXLAN tunnel endpoint (VTEP) addresses;
  maintain a plurality of media access control (MAC) addresses for the endpoints;
  receive a VXLAN encapsulated packet from a source VTEP, wherein the VXLAN encapsulated packet identifies a default gateway Media Access Control (MAC) address corresponding to the VXLAN gateway in an inner header and an address of the VXLAN gateway as a destination address in a VXLAN header;
  replace the default gateway MAC address with an endpoint MAC address in the inner header and replace the address of the VXLAN gateway with a destination virtual tunnel endpoint (VTEP) address in the VXLAN header; and
  forward the VXLAN encapsulated packet to the destination VTEP,
  wherein the source VTEP and the destination VTEP are located within different VXLAN networks.

18. The computer program product of claim 17, wherein the MAC addresses for the endpoints are maintained in an Address Resolution Protocol (ARP) cache.

19. The computer program product of claim 18, wherein the computer executable instructions further cause the VXLAN gateway to initiate an ARP request when the VXLAN encapsulated packet received from the source VTEP is destined for a destination endpoint that has a MAC address not found within the ARP cache.

20. The computer program product of claim 17, wherein the VXLAN encapsulated packet is modified to include the MAC address of a destination endpoint prior to forwarding the VXLAN encapsulated packet to the destination VTEP.

* * * * *